United States Patent
Liu et al.

(10) Patent No.: US 11,479,488 B2
(45) Date of Patent: Oct. 25, 2022

(54) NANO IRON BIOLOGICAL COUPLING DEVICE FOR ORGANIC WASTEWATER AND ITS PROCESS

(71) Applicant: Tongji University, Shanghai (CN)

(72) Inventors: Nuo Liu, Shanghai (CN); Weixian Zhang, Shanghai (CN); Airong Liu, Shanghai (CN); Jing Liu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 102 days.

(21) Appl. No.: 17/031,928

(22) Filed: Sep. 25, 2020

(65) Prior Publication Data
US 2022/0041480 A1    Feb. 10, 2022

(30) Foreign Application Priority Data

Aug. 6, 2020  (CN) .......................... 202010781342.7

(51) Int. Cl.
*C02F 3/12*       (2006.01)
*C02F 3/08*       (2006.01)
*C02F 103/34*   (2006.01)
*C02F 101/36*   (2006.01)
(Continued)

(52) U.S. Cl.
CPC ............ *C02F 3/1268* (2013.01); *C02F 3/082* (2013.01); *C02F 3/1215* (2013.01); *C02F 2101/22* (2013.01); *C02F 2101/345* (2013.01); *C02F 2101/36* (2013.01); *C02F 2103/34* (2013.01)

(58) Field of Classification Search
None
See application file for complete search history.

(56) References Cited

U.S. PATENT DOCUMENTS

| 2016/0031766 A1* | 2/2016 | Bezbaruah | .............. C05B 17/00 |
| | | | 210/683 |
| 2019/0092667 A1* | 3/2019 | Chidambaran | ......... C02F 1/001 |

(Continued)

FOREIGN PATENT DOCUMENTS

| CN | 105502870 A | * | 4/2016 | |
| CN | 108067090 A | * | 5/2018 | ............. B01D 53/50 |

*Primary Examiner* — Chester T Barry
(74) *Attorney, Agent, or Firm* — Bayramoglu Law Offices LLC

(57) ABSTRACT

A nano zero valent iron biological coupling device for organic wastewater includes a continuous flow stirred reactor, a flocculation sedimentation device and a membrane bioreactor arranged in series. A nano zero valent iron feeding device is arranged in the continuous flow stirred reactor, a flocculant and a coagulant aid are arranged in the flocculation sedimentation device, and a microbial reaction liquid is arranged in the membrane bioreactor. A nano iron biological coupling process includes: S1, placing the organic wastewater in the continuous flow stirred reactor, adding the nano zero valent iron, stirring and mixing; S2, placing the organic wastewater treated after S1 in the flocculation sedimentation device; S3, placing the organic wastewater treated after S2 in the membrane bioreactor and interacting with the microbial reaction liquid; S4, performing a membrane separation on the organic wastewater treated after S3 in the membrane bioreactor to obtain purified organic wastewater.

6 Claims, 2 Drawing Sheets

(51) Int. Cl.
  *C02F 101/34* (2006.01)
  *C02F 101/22* (2006.01)

(56) References Cited

U.S. PATENT DOCUMENTS

2020/0087179 A1* 3/2020 Wismer .................... C02F 1/52
2022/0055933 A1* 2/2022 Yin .......................... C02F 9/00

* cited by examiner

NANO IRON BIOLOGICAL COUPLING DEVICE FOR ORGANIC WASTEWATER AND ITS PROCESS

CROSS REFERENCE TO THE RELATED APPLICATIONS

This application is based upon and claims priority to Chinese Patent Application No. 202010781342.7, filed on Aug. 6, 2020, the entire contents of which are incorporated herein by reference.

TECHNICAL FIELD

The present invention relates to the technical field of wastewater treatment, and in particular to a nano iron biological coupling device for organic wastewater and its process.

BACKGROUND

With the development of China's manufacturing industry, a large number of organic wastewaters containing high-valence metals has been produced. For example, the organic wastewater containing high-valence metals produced by printing and dyeing industry has become one of the largest sources of wastewater, with an annual output of nearly 2 billion tons. The pollutants mainly come from dyes and chemical reagents used in the textile production and reprocessing process. The content of organic matter is high, the types of organic matter are complex, and the chemical oxygen demand (COD) is more than 1000 mg/L, which causes outstanding environmental problems, jeopardizing the safety of both groundwater and residential drinking water. Currently, techniques for polluted water remediation in China include using biological method, physical-chemical method, etc. Because printing and dyeing wastewater is composed of benzene-related high-molecular polymer or heterocyclic substances, high load pollutants cannot be effectively degraded by either biological or physical-chemical method as there are disadvantages with both methods, such as high treatment cost, poor treatment effect for high load pollutants and incomplete treatment for organic matters.

Nano zero valent iron (nZVI) has attracted much attention in the field because of its excellent oxidation-reduction properties, good electrochemical and coordination chemical properties. In recent years, nZVI has been widely used in the treatment and remediation of a variety of pollutants, including organic pollutants in water bodies that are difficult to degrade, such as halogenated organic matters, aromatic compounds, azo compounds, nitrates, and phosphates. Professor Zhang Weixian's research group has carried out a series of studies on the reaction characteristics, self-structures, modifications, and regulations of nano iron with different pollutants. Research has found that the reaction rate constant of nano iron with heavy metals is 2-3 orders of magnitude higher than that of micron-sized iron powder. However, nano iron has the disadvantages of easy corrosion, resulting in low reaction efficiency and incomplete treatment of organic matters.

SUMMARY

In view of the above-mentioned defects and shortcomings of the prior art, present invention provides a nano iron biological coupling device for organic wastewater, including a continuous flow stirred reactor, a flocculation sedimentation device and a membrane bioreactor arranged in series. The continuous flow stirred reactor is internally provided with a nano zero valent iron feeding device, the flocculation sedimentation device is internally provided with a flocculant and a coagulant aid, and the membrane bioreactor is internally provided with a microbial reaction liquid, and further, the microbial reaction liquid is a microbial activated and domesticated sludge.

Preferably, the continuous flow stirred reactor is also provided with a detection device, and the detection device includes a potential detection device and a pH value detection device.

Preferably, a reflux pipeline is arranged between the continuous flow stirred reactor and the flocculation sedimentation device.

Present invention also provides a nano iron biological coupling process for organic wastewater, including the following steps: S1, placing the organic wastewater in the continuous flow stirred reactor, adding 0.05-0.2 g/L, of nano zero valent iron, stirring and mixing for 1-3 h; S2, placing the organic wastewater treated after step S1 in the flocculation sedimentation device, wherein the flocculant is polymeric ferric sulfate, and the coagulant aid is polyacrylamide; S3, placing the organic wastewater treated after step S2 in the membrane bioreactor and interacting with the microbial reaction liquid for 6-10 h, wherein the microbial reaction liquid derives from sludge of a wastewater treatment plant, and mixed liquor suspended solids (MLSS) of the microbial reaction liquid is 4-6 g/L; S4, performing a membrane separation on the organic wastewater treated after step S3 in the membrane bioreactor to obtain purified organic wastewater.

Preferably, in step S1, the redox potential and the pH value of the organic wastewater is detected by the detection device, and the nano zero valent iron is added into the organic wastewater intermittently.

Preferably, an average particle size of the nano zero valent iron is 40-75 nm. Preferably, the concentration of the polymeric ferric sulfate is 80-100 mg/L, and the concentration of the polyacrylamide is 1-5 mg/L.

Preferably, the organic wastewater includes industrial wastewater, underground water body, sludge and semi-solid pollutants polluted by heavy metals, organic pollutants, and composite pollutants; the heavy metals include chromium, copper, nickel, lead and zinc, and the organic pollutants include halogenated hydrocarbons, polychlorinated biphenyls and p-octylphenol (POPS).

Due to the adoption of the above technical scheme, compared with the prior art, the present invention is carried out as follows. The high concentration organic wastewater is treated by the strong reduction of nano zero valent iron, the pollutants are adsorbed on the surface of the nano zero valent iron. The high-valence metals are reduced to a low-valence state, and the macromolecule organic matter is degraded into small molecular organic matter, reducing organic pollutants and heavy metals, which can effectively diminish the pollution load and reduce the organic matter to low-toxic substances, and some heavy metals are directly reduced to elementary substances or form precipitates with ligands. The excessive nano zero valent iron in the flocculation sedimentation device is then returned through the reflux pipeline, so that the unreacted nano zero valent iron can be reused. The organic wastewater with reduced toxicity creates favorable conditions for subsequent microbial reactions, and the pollutants are further biodegraded by microorganisms. The present invention has the advantages of simple operation, high efficiency, wide application range and no secondary pollution.

Figure 1:
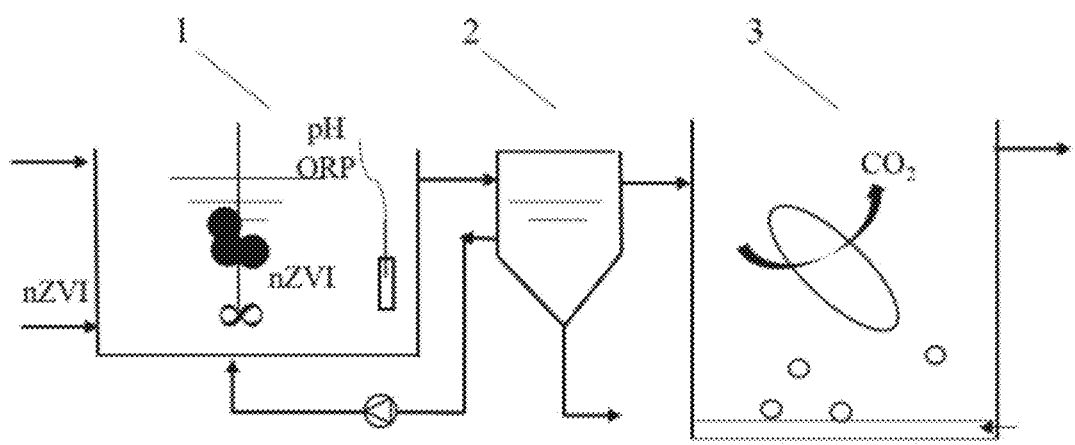
FIG. 1 is a flow diagram showing a nano iron biological coupling process for organic wastewater provided by the present invention.
Figure 2:
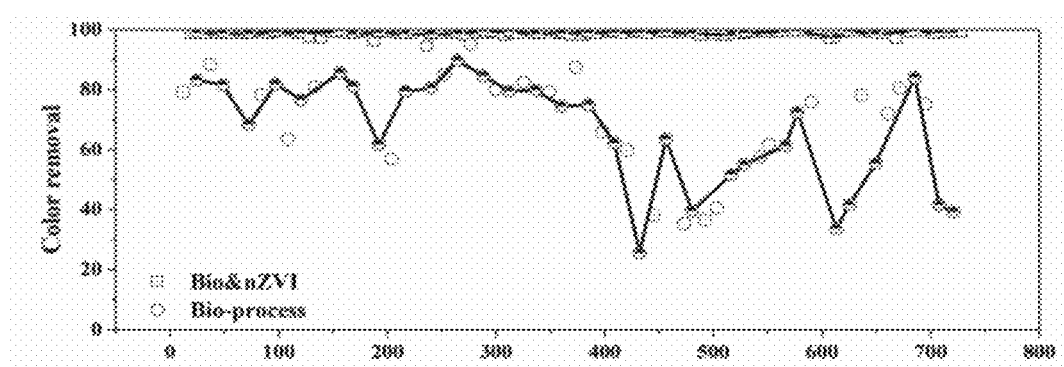
FIG. 2 is a comparison diagram showing initial Congo red (CR) treatment results between a nano iron biological coupling process for organic wastewater provided by the present invention and an existing biotechnology.
Figure 3:
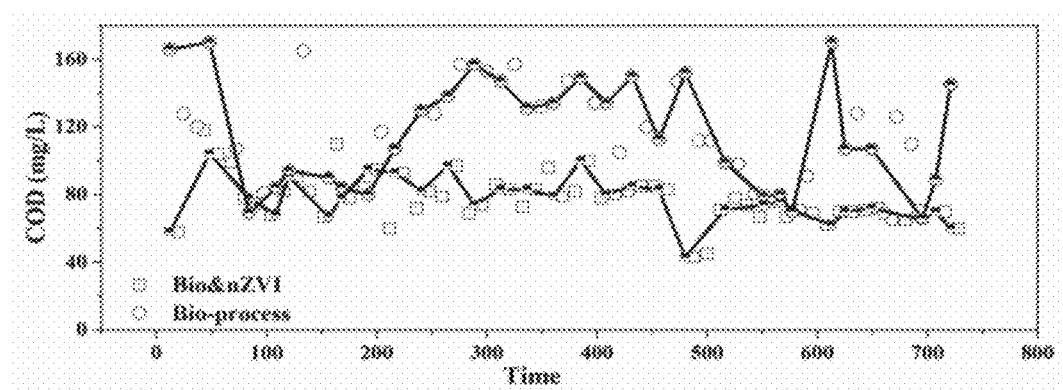
FIG. 3 is a comparison diagram showing COD treatment results between the nano iron biological coupling process for the organic wastewater provided by the present invention and the existing biotechnology.

In the drawings: 1-continuous flow stirred reactor, 2-flocculation sedimentation device, 3-membrane bioreactor.

DETAILED DESCRIPTION OF THE EMBODIMENTS

The present invention will be described in more detail below with reference to the accompanying figures of embodiments of the present invention shown below. However, the present invention may be realized in many different forms and should not be interpreted as limited by the embodiments presented herein. On the contrary, these embodiments are provided to achieve a full and complete disclosure, and to enable those skilled in the art fully understand the scope of the present invention. In these figures, the sizes and relative sizes of layers and regions may be enlarged for clarity.

As shown in FIG. 1, the present invention provides a nano iron biological coupling device for organic wastewater, including the continuous flow stirred reactor 1, the flocculation sedimentation device 2 and the membrane bioreactor 3 arranged in series. The continuous flow stirred reactor 1 is internally provided with a nano zero valent iron feeding device, and a stirring liquid is mixed with organic wastewater for reaction. The continuous flow stirred reactor 1 is also provided with a detection device, and the detection device includes a potential detection device and a pH value detection device to detect the potential and pH value of the wastewater in the continuous flow stirred reactor 1. The flocculation sedimentation device 2 is internally provided with a flocculant and a coagulant aid, and the membrane bioreactor 3 is internally provided with a microbial reaction liquid. Additionally, the microbial reaction liquid is but not limited to the microbial activated and domesticated sludge. The microorganism in the membrane bioreactor 3 is an aerobic microorganism. Air is introduced from the bottom of the membrane bioreactor 3 to supply oxygen for the microorganism. A reflux pipeline is arranged between the continuous flow stirred reactor 1 and the flocculation sedimentation device 2, through which the unreacted nano zero valent iron can be recycled and reused.

The present invention also provides a nano iron biological coupling process for organic wastewater, including the following steps:

S1, the organic wastewater is mixed with nano zero valent iron with an average particle size of 40-75 nm in the continuous flow stirred reactor 1 for 1-3 hr, at the same time, a redox potential and a pH value of the organic wastewater are detected by the detection device, and the nano zero valent iron is added into the organic wastewater intermittently;

S2, the organic wastewater treated after step S1 is placed in the flocculation sedimentation device 2. The flocculant is polymeric ferric sulfate with a concentration of 80-100 mg/L, and the coagulant aid is polyacrylamide with a concentration of 1-5 mg/L. The flocculated sediment is separated and discharged from the bottom, and the unreacted nano zero valent iron is recycled and reused through the reflux pipeline; and S3, the organic wastewater treated after step S2 is placed in the membrane bioreactor 3 and interacted with the microbial reaction liquid for 6-10 hr. The mixed liquor suspended solids (MLSS) of the microbial reaction liquid is 4-6 g/L. S4, the organic wastewater treated after step S3 is subjected to a membrane separation in the membrane bioreactor 3 to obtain purified organic wastewater.

The organic wastewater of the present invention includes industrial wastewater, underground water body, sludge and semi-solid pollutants polluted by heavy metals, organic pollutants and composite pollutants; the heavy metals include chromium, copper, nickel, lead and zinc, and the organic pollutants include halogenated hydrocarbons, polychlorinated biphenyls and p-octylphenol (POPs).

Three embodiments are described in detail below.

Embodiment 1, dye wastewater with an initial Congo red (CR) concentration of 500 mg/L, COD of 167 mg/L and TOC of 57 mg/L is firstly passed through the continuous flow stirred reactor 1 with a residence time of 1 hr; treated wastewater is passed through the flocculation sedimentation device 2, and excessive nano zero valent iron is settled and then flows back into the continuous flow stirred reactor 1; reacted wastewater is passed through the membrane bioreactor 3 with a residence time of 6 hr for further biodegradation; finally, an obtained mixed liquid is subjected to a membrane separation, and effluent water is detected to have CR of 20 mg/L, COD of less than 90 mg/L, and TOC of less than 35 mg/L.

Embodiment 2, dye wastewater with an initial Congo red (CR) concentration of 500 mg/L, COD of 167 mg/L and TOC of 57 mg/L is firstly passed through the continuous flow stirred reactor 1 with a residence time of 2 hr; treated wastewater is passed through the flocculation sedimentation device 2, and excessive nano zero valent iron is settled and then flows back into the continuous flow stirred reactor 1; reacted wastewater is passed through the membrane bioreactor 3 with a residence time of 8 hr for further biodegradation; finally, an obtained mixed liquid is subjected to a membrane separation, and effluent water is detected to have CR of 9 mg/L, COD of less than 70 mg/L, and TOC of less than 27 mg/L.

Embodiment 3, dye wastewater with an initial Congo red (CR) concentration of 500 mg/L, COD of 167 mg/L and TOC of 57 mg/L is firstly passed through the continuous flow stirred reactor 1 with a residence time of 1 hr; treated wastewater is passed through the flocculation sedimentation device 2, and excessive nano zero valent iron is settled and then flows back into the continuous flow stirred reactor 1; reacted wastewater is passed through the membrane bioreactor 3 with a residence time of 6 hr for further biodegradation; finally, an obtained mixed liquid is subjected to a membrane separation, and effluent water is detected to have CR of 20 mg/L, COD of less than 90 mg/L, and TOC of less than 35 mg/L.

As it should be understood by those skilled in the art, the present invention may be realized in many other specific forms without departing from its own spirit or scope. Although embodiments of the present invention have been described, it should be understood that the present invention should not be limited to these embodiments, and those skilled in the art may make changes and modifications within the spirit and scope of the present invention as defined in the appended claims.

What is claimed is:

1. A nano iron biological coupling process for organic wastewater, wherein the nano iron biological coupling process is applied to a nano iron biological coupling device comprising:
    a continuous flow stirred reactor;
    a flocculation sedimentation device; and
    a membrane bioreactor;
    wherein the continuous flow stirred reactor, the flocculation sedimentation device, and the membrane bioreactor are arranged in series; a nano zero valent iron feeding device is arranged in the continuous flow stirred reactor, a flocculant and a coagulant aid are arranged in the flocculation sedimentation device, and a microbial reaction liquid is arranged in the membrane bioreactor;
    wherein the nano iron biological coupling process comprises the following steps:
    S1, placing the organic wastewater in the continuous flow stirred reactor, adding 0.05-0.2 g/L of nano zero valent iron, stirring and mixing for 1-3 hours to obtain first treated organic wastewater;
    S2, placing the first treated organic wastewater treated after step S1 in the flocculation sedimentation device to obtain second treated organic wastewater, wherein the flocculant is polymeric ferric sulfate, and the coagulant aid is polyacrylamide;
    S3, placing the second treated organic wastewater treated after step S2 in the membrane bioreactor and interacting the second treated organic wastewater with the microbial reaction liquid for 6-10 hours to obtain third treated organic wastewater, wherein mixed liquor suspended solids (MLSS) of the microbial reaction liquid is 4-6 g/L; and
    S4, performing a membrane separation on the third treated organic wastewater treated after step S3 in the membrane bioreactor to obtain purified organic wastewater;
    wherein the organic wastewater comprises industrial wastewater, underground water body, sludge, and semi-solid pollutants, wherein the industrial wastewater, the underground water body, the sludge, and the semi-solid pollutants are polluted by heavy metals, organic pollutants, and composite pollutants, wherein the heavy metals comprise chromium, copper, nickel, lead and zinc, and the organic pollutants comprise halogenated hydrocarbons, polychlorinated biphenyls and p-octylphenol (POPs).

2. The nano iron biological coupling process according to claim 1, wherein in step S1, a redox potential of the organic wastewater and a pH value of the organic wastewater are detected by a detection device, and the nano zero valent iron is added into the organic wastewater intermittently.

3. The nano iron biological coupling process according to claim 1, wherein an average particle size of the nano zero valent iron is 40-75 nm.

4. The nano iron biological coupling process according to claim 1, wherein a concentration of the polymeric ferric sulfate is 80-100 mg/L, and a concentration of the polyacrylamide is 1-5 mg/L.

5. The nano iron biological coupling process according to claim 1, wherein the continuous flow stirred reactor comprises a detection device, wherein the detection device comprises a potential detection device and a pH value detection device.

6. The nano iron biological coupling process according to claim 1, wherein a reflux pipeline is arranged between the continuous flow stirred reactor and the flocculation sedimentation device.

* * * * *